United States Patent [19]

Reyes et al.

[11] Patent Number: 4,522,563
[45] Date of Patent: Jun. 11, 1985

[54] ELASTOMERIC SYSTEM FOR MOUNTING A HELICOPTER ROTOR

[75] Inventors: Peter A. Reyes, Watauga; Robert H. Finney, Arlington, both of Tex.

[73] Assignee: Bell Helicopter Textron, Inc., Fort Worth, Tex.

[21] Appl. No.: 395,789

[22] Filed: Jul. 6, 1982

[51] Int. Cl.³ ............................................... B64C 11/12
[52] U.S. Cl. .................... 416/134 A; 416/148
[58] Field of Search .............. 416/134 A, 138 A, 141, 416/102, 148 (U.S. only)

[56] References Cited

U.S. PATENT DOCUMENTS

| | | | |
|---|---|---|---|
| 2,487,653 | 11/1949 | Heintze | 416/134 A X |
| 2,830,669 | 4/1958 | Klockner | |
| 3,384,185 | 5/1968 | Fernandez | |
| 3,457,997 | 7/1969 | Mackenzie et al. | |
| 3,652,185 | 3/1972 | Creasap et al. | |
| 3,669,564 | 6/1972 | Garfinkle | 416/134 A X |
| 3,669,566 | 6/1972 | Bourquardez et al. | |
| 3,765,267 | 10/1973 | Bourquardez et al. | |
| 3,790,302 | 2/1974 | Pascher | 416/134 A |
| 3,804,552 | 4/1974 | Covington | 416/134 A |
| 3,807,896 | 4/1974 | Johnson | 416/134 A X |
| 3,874,815 | 4/1975 | Baskin | |
| 3,880,551 | 4/1975 | Kisovec | |
| 3,967,918 | 7/1976 | Mouille et al. | |
| 4,012,169 | 3/1977 | Mouille et al. | |
| 4,108,508 | 8/1978 | Clinard | 416/134 A X |
| 4,115,031 | 9/1978 | Drees et al. | 416/134 A |
| 4,227,857 | 10/1980 | Reyes | 416/134 A |
| 4,257,739 | 3/1981 | Covington et al. | |
| 4,293,276 | 10/1981 | Brogdon et al. | |
| 4,306,837 | 12/1981 | Brogdon et al. | |
| 4,333,728 | 6/1982 | Drees et al. | 416/134 A |
| 4,395,143 | 7/1983 | Bakken et al. | 416/134 A X |

OTHER PUBLICATIONS

Conception Data Sheet, Disclosure No. 74-19, Bell Helicopter Co., Apr. 4, 1974.
"Elastomeric Bearing Application to Helicopter Tail Rotor Designs", Fagan, C. H., Americam Helicopter Society, Jan. 25, 1968.

*Primary Examiner*—Everette A. Powell, Jr.
*Attorney, Agent, or Firm*—Richards, Harris, Medlock & Andrews

[57] ABSTRACT

This invention relates to a system for mounting a helicopter rotor on a flapping axis and, more particularly, to use of an improved unitary trunnion-bearing structure of minimal parts which may be selectively preloaded and which is readily installed.

2 Claims, 5 Drawing Figures

ELASTOMERIC SYSTEM FOR MOUNTING A HELICOPTER ROTOR

BACKGROUND ART

The mounting of tail rotors of helicopters presents problems somewhat more difficult of solution than mounting main helicopter rotors because of the smaller size involved, preventing utilization of some of the measures that are readily adaptable to larger main rotor mountings.

Indicative that problems are involved in providing suitable bearings for use in tail rotors of helicopters is a paper entitled, "Elastomeric Bearing Application To Helicopter Tail Rotor Designs" by C. H. Feagan, published in 1968 by the Southwest Region of the American Helicopter Society and also published in the October, 1968 issue of the American Helicopter Society Journal. Various uses of elastomeric radial bearings and elastomeric thrust bearings were discussed. Also indicated were the use of bonded elastomeric radial bearings and molded elastomeric radial bearings for mounting a tail rotor on its teetering axis.

It has been found that significant improvements can be achieved by utilizating bearings hereinafter described to mount a rotor on its flapping axis.

DISCLOSURE OF THE INVENTION

The present invention involves a unitary trunnion system mounting a teetering helicopter rotor onto a mast. A main body is provided with a central portion through which a central bore extends for receiving the mast. The main body has an integral pair of opposed conical shafts on a common axis which axis perpendicularly intersects the axis of the central bore. An elastomeric bearing ring is adhered to the surface of each shaft and has conical shims therein with the same cone angle as the shafts. An outer mounting ring on each of the bearings is adhered to the elastomeric bearing ring at an internal conical surface of the same angle as the extensions and the shims. Finally, rotor hub structure is provided to receive and clamp the mounting rings for rotation with the rotor blade as it teeters on the common axis relative to the shafts which are fixed to the mast. In a preferred embodiment, the hub structure for the rotor is provided with a lateral bore defining the flapping axis of the rotor and into which the outer mounting rings are received with end plates being provided for engaging outboard surfaces at the mounting rings for selectively preloading the elastomeric bearing rings.

BRIEF DESCRIPTION OF THE DRAWINGS

For a more complete understanding of the present invention and for further object advantages thereof, reference may now be had to the following description taken in conjunction with the accompanying drawings in which.

DETAILED DESCRIPTION

Figure 1:
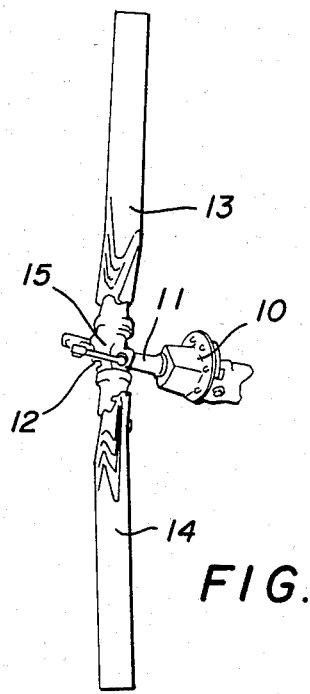
FIG. 1 is a view of a helicopter tail rotor.

FIG. 1 is a view of a helicopter tail rotor and its mast. A transmission unit 10 is mounted on the tail boom and has a mast 11 extending therefrom. A hub structure 12 is provided for mounting blades 13 and 14 for teetering motion relative to mast 11. A pitch change linkage 15 is provided for control of the pitch of the blades 13 and 14 with the pitch change mechanism extending from the hub 12.

The present invention is directed to a simple readily installable selectively preloaded mounting for the rotor system on its flapping axis.

Figure 2:
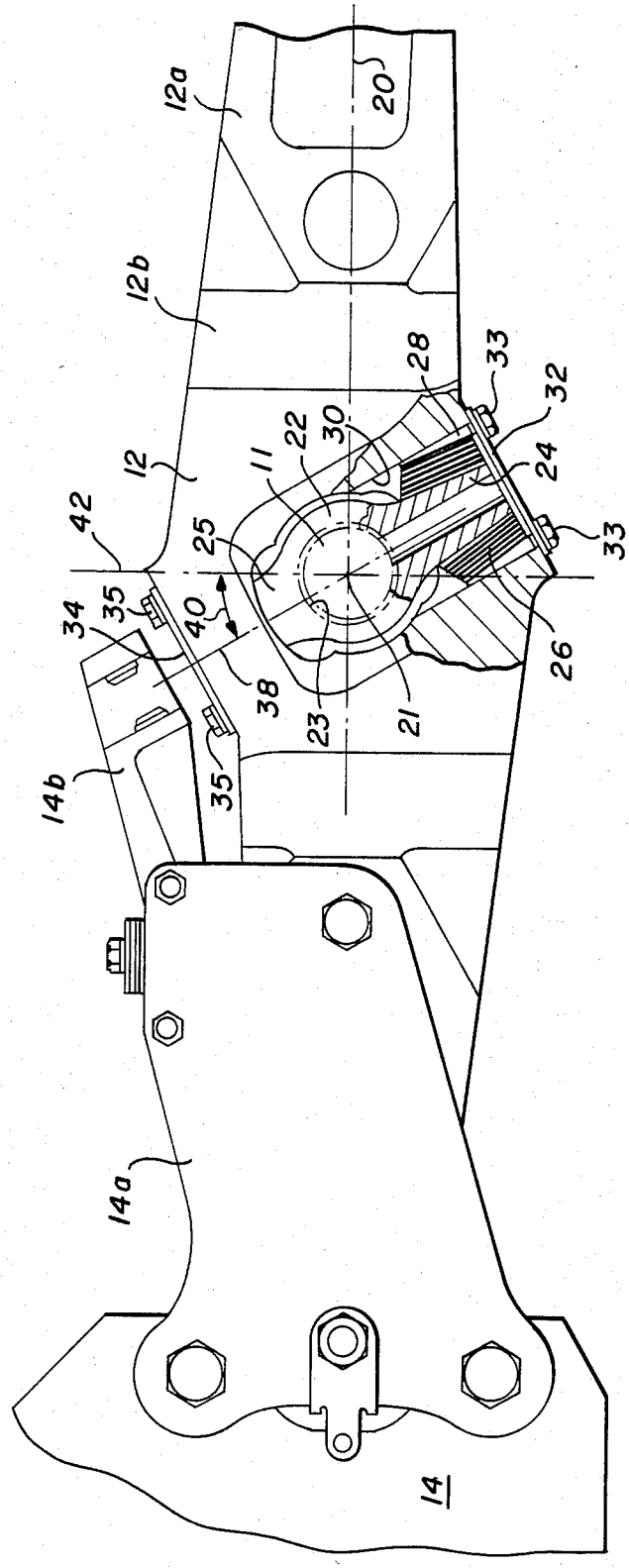
FIG. 2 is a top view partially in section of a center portion of the rotor of FIG. 1 as mounted on a rotor mast.

FIG. 2 is a view partially in section of an embodiment of the invention wherein blade 13 of FIG. 1 has been removed and wherein blade 14 is partially shown as mounted on a hub structure 12 by means of suitable grips such as grip 14a. Pitch horns are provided for both of the blades, the pitch horn 14b being shown in its relation to the grip 14a and blade 14.

The blade 14 and grip 14a have a span axis 20 which passes through the center 21 of mast 11. The upper end of the mast 11 is shown partly in section as being received in and secured by a spline structure in a central bore of a main trunnion body 22. Body 22 not only has the spline central aperature 23 but has outwardly extending conical shafts 24 and 25. Shaft 24 is shown in section and shaft 25 is partially shown in plan view. The central body portion 22 and integral shafts 24 and 25 form a trunnion for mounting the tail rotor onto mast 11.

Shaft 24 is conical and is provided with a central bore. An elastomeric bearing ring 26 is adhered to the outer surface of the conical shaft 24. The elastomeric bearing ring is provided with alternate conical layers of rubber and conical metal shims, the cone angles of which are the same as the cone angle of the shaft 24.

An outer mounting ring 28 is adhered at its inner conical surface to the outer surface of the elastomeric bearing ring 26. The outer diameter of the mounting ring 28 is sized to be received and closely fit into a transverse bore 30 formed in the hub 12. The outer diameter of the mounting ring 28 is slightly greater than the diameter of the main body portion 22 of the trunnion.

The portion of the trunnion formed by shaft 25 is of the same construction as shown with respect to shaft 24 and, thus, is provided with a similar elastomeric bearing and outer mounting ring.

Bore 30 is closed by an end plate 32 which is secured by an array of bolts 33. The mounting ring 28 extends into contact with the inner surface of the end plate 32 whereas the inner surface of plate 32 is spaced from the confronting ends of the elastomeric ring 26 and the end of shaft 24. Thus, as the bolts 33 are tightened, the elastomeric ring is selectively preloaded by the applied preload force against the mounting ring 28. It will be noted that closure plate 34 closes the end of bore 30 opposite plate 32 with bolts 35 being utilized to secure the same and to aid in the preloading of the two elastomeric bearings. The outer mounting ring 28 is keyed to the hub 12 so that the outer mounting ring 28 must rotate with hub 12 as the rotor flaps on flapping axis 38. The flapping axis 38 is oriented at an angle 40 from the transverse reference axis 42. Thus, the blade is permitted to flap on axis 38.

In order to remove, service or replace the tail rotor bearings of the present invention, all that is required is that the bolts 33 be removed and end plate 32 removed and then the trunnion 22, 24, 25, 26 and 28 can slide out of the bore 30. Thus, the system involves a minimum of parts.

It will be noted that the hub 12 is provided with a yoke 12a to which blade 13 will be affixed. Yoke 12a has a thin bending section 12b to accommodate coning motion.

Figure 4:
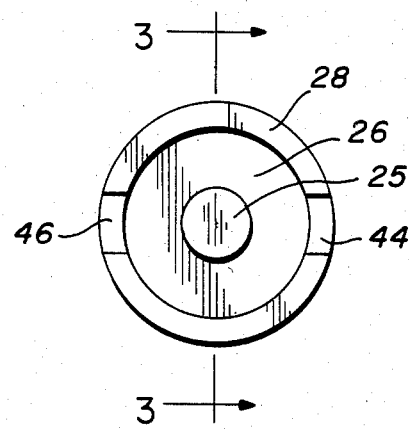
FIG. 4 is an end view of the unit of FIG. 3.
Figure 3:
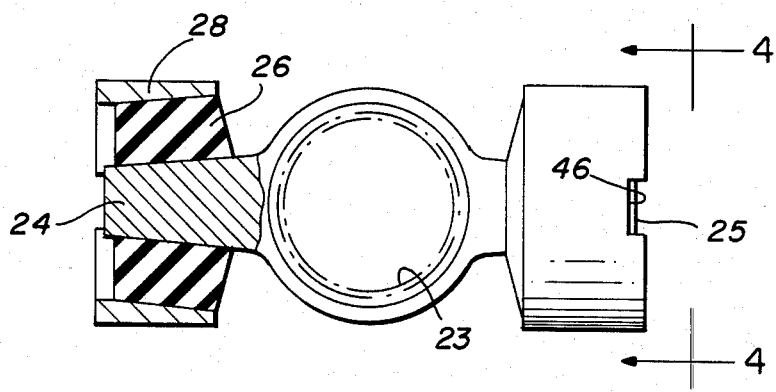
FIG. 3 is a sectional view of the mounting unit of FIGS. 1 and 2 as taken along lines 3—3 of FIG. 4.

FIG. 3 illustrates the mounting unit of FIGS. 1 and 2 as viewed partially in section along lines 3—3 of FIG. 4. The outer mounting ring 28 is adhered to the elastomeric body ring 26. Ring 26 is mounted on the conical shaft 24. The end of the trunnion opposite shaft 24 has been shown in plan view with the end of shaft 25 appearing in an anchor notch 46 in the end of the mounting ring on shaft 25.

As seen in FIG. 4, shaft 24 and elastomeric ring 26 are positioned inside the outer mounting ring 28. Ring 28 has diametrically opposed notches 44 and 46. Suitable keys on end plates 32 and 34 are provided for registering in slots 44 and 46 so that the outer mounting ring is keyed to hub 12 so that the outer ring must rotate with hub 12 as the blade flaps on axis 38. Since elastomeric ring 26 is adhered on its inner surface to the outer surface of shaft 24, elastomeric body provides for rotation with opposing forces being produced in the elastomeric structure.

Figure 5:
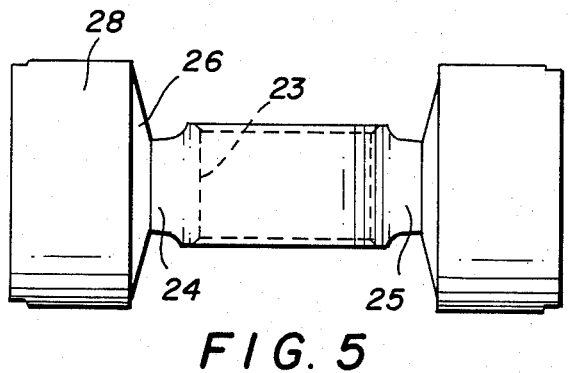
FIG. 5 is a side view of the unit of FIG. 3.

FIG. 5 is a front view of the trunnion of FIGS. 3 and 4. It will be noted that the central portion of the main body while circular in configuration in FIG. 3 is relatively flat as shown in FIG. 5, thus forming a relatively short cylindrical body from which the shafts 24 and 25 extend.

In use, it has been found that the structure illustrated herein and above described is particularly suitable for mounting tail rotors on helicopter units as manufactured by Bell Helicopter Textron, Inc. of Hurst, Tex., and specifically identified as Model No. 206. In a preferred embodiment of tail rotor mounting, the spring rates for such an installation preferably would have a torsional spring rate $K_t$ of 6 to 8 in.lb./degree. The axial spring rate $K_a$ preferably is about 4000 lb./in. minimum. The radial spring rate $K_r$ preferably is about 200,000 lb./in. minimum.

Thus, in accordance with the present invention, there is provided a teetering helicopter rotor mounted onto a mast by a trunnion comprising a main body having a central portion with a central bore therethrough. The mast is received in the central bore. The main body has a pair of opposed conical shafts on a common axis which perpendicularly intersects the axis of the central bore. The main body and shafts thus form a unitary trunnion on which the teetering rotor is to be mounted relative to the main mast.

An elastomeric bearing ring is adhered to the surface of each conical shaft and has conical shims therein of the same cone angle as the shafts. An outer mounting ring on each of the bearings is adhered to the elastomeric bearing ring on an internal conical surface of the same angle as the extensions and shims. A rotor hub structure is adapted to receive and to clamp the mounting rings for rotation at the rotor blades as it teeters on a common axis, which rotation is opposed by the torsional restraints provided by the elastomeric body.

Although the invention has been described in connection with the specific embodiment wherein a tail rotor is mounted on a helicopter, it will be apparent that the same type of structure may be employed for mounting main rotors to the main helicopter mast. However, it is particularly advantageous over prior art systems in connection with tail rotor mounting because of the few parts involved and the structure wherein the bearings can be selectively preloaded.

Although preferred embodiments of the invention have been described in detail, it is to be understood that various changes, substitutions, and alterations can be made therein without departing from the spirit and scope of the invention as defined by the appended claims.

We claim:

1. A system for mounting a teetering helicopter rotor onto a mast including:
   a main body having a central portion having a central bore therethrough for receiving the mast;
   a pair of opposed conical shafts extending from said main body on a common axis which perpendicularly intersects the axis of said central bore;
   elastomeric bearing rings having conical shims therein of the same cone angle as the angle of said conical shaft and being circumferentially disposed around said conical shafts;
   outer mounting rings having interior and exterior surfaces, said interior surfce having the same cone angle as the angle of said conical shafts and being circumferentially disposed around said elastomeric bearing rings; and
   tail rotor hub structure adapted to receive said exterior surface of said outer mounting rings for rotation with the rotor as it teeters on said common axis.

2. The combination set forth in claim 1 in which said hub structure has a transverse bore to receive said outer mounting rings and in which said central portion of said main body is of maximum dimension less than the diameter of said outer mounting rings whereby said main body, elastomeric bearings rings, and outer mounting rings can be inserted into said transverse bore along said common axis.

* * * * *